United States Patent Office

3,395,195
Patented July 30, 1968

3,395,195
ACETYLENE REMOVAL PROCESS AS CUPROUS ACETYLIDE PRECIPITATE
Mortimer May, New York, N.Y., and Robert B. Long, Atlantic Highlands, N.J., assignors to Esso Research and Engineering Company, a corporation of Delaware
No Drawing. Filed Mar. 18, 1966, Ser. No. 537,610
10 Claims. (Cl. 260—681.5)

ABSTRACT OF THE DISCLOSURE

Acetylenes in $C_2$–$C_{12}$ range (for example vinylacetylene in butadiene) are selectively removed in an aqueous basic treating solution containing precipitated cuprous acetylides. Recovery of the acetylenes and preparation of the cuprous solution (55–87 wt. percent water) for recycle is accomplished without explosion.

---

The present invention relates to a highly economic process for selectively removing and recovering acetylenes from gaseous or liquid streams containing also other highly reactive materials. More particularly, this invention relates to a process (on a batch-wise or continuous basis) whereby acetylene-containing streams are contacted with an aqueous basic solution containing cuprous salts thereby converting the acetylenes into precipitated cuprous acetylides and recovering the acetylenes from the cuprous acetylides.

It is well known that precipitated acetylides can result under certain conditions upon contacting acetylene-containing streams with basic cuprous salt solutions but prior art processes are directed to the avoidance of precipitated cuprous acetylides because they create plugging problems and are hazardous due to their tendency to decompose with violence, e.g. see U.S. 2,566,136. Unfortunately these prior art processes, in avoiding the problems attendant to the formation of precipitated cuprous acetylides, concurrently reduce the capacity of the treating solution to selectively remove acetylenes and large quantities of treating solution are needed to solubilize the cuprous acetylides. Moreover, the prior art processes require the use of treating solutions containing a relatively high concentration of cuprous salts and are therefore disadvantageous for several reasons. Some valuable reactive materials (in addition to the cuprous acetylides) are dissolved to a significant extent in processes making use of large volumes of treating solution containing a high concentration of cuprous salts; upon liberating the acetylenes by heating the solution containing dissolved cuprous acetylides, the highly reactive materials are also driven off with the acetylenes thus defeating the entire purpose of the process, i.e. to separate acetylenes from highly reactive materials and to recover both the acetylenes and the highly reactive materials in a pure state.

A second disadvantage of the prior art processes is that by solubilizing the cuprous acetylides rather than permitting them to be precipitated out, the "driving force" of the reaction (i.e. the precipitation) is absent and thus the reaction does not go to completion, thereby reducing the effectiveness of the treating solution. Finally, upon heating the cuprous acetylides dissolved in the concentrated cuprous salt treating solution, the acetylenes are polymerized which not only results in the loss of valuable acetylenes but also increases the difficulty in removing unpolymerized acetylenes from the treating solution, see for example U.S. 2,847,487.

The present process to be described in detail represents a major step forward over prior art processes (1) as to its ability to completely remove acetylenes to a level of below 50 p.p.m., e.g. <10 p.p.m. by short residence time-contacting with a small volume of treating solution, (2) as to its ability to recover the said acetylenes in essentially pure form, e.g. above 95% purity, thereby minimizing loss of desired product in purification processes and giving a pure acetylene product in acetylene recovery processes, and (3) as to its ability to remove the acetylenes very economically by substantially complete recovery of the treating solution.

This invention comprises contacting an acetylene-containing stream with a treating solution containing cuprous salts so as to cause the acetylenes present in the stream to be precipitated out in the form of cuprous acetylides. The acetylenes and the treating solution are then recoverable by heating the resultant slurry as exemplified by the following reaction:

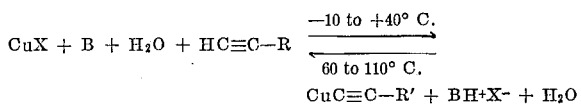

$$CuX + B + H_2O + HC{\equiv}C{-}R \xrightarrow[60 \text{ to } 110^\circ C.]{-10 \text{ to } +40^\circ C.} CuC{\equiv}C{-}R' + BH^+X^- + H_2O$$

wherein CuX is a cuprous salt, B is a base and R is hydrogen or an organic radical such as a $C_1$ to $C_{10}$ alkyl or alkylene group.

The acetylene-containing stream is, for example, a crude stream obtained from refinery operations. The crude stream is usually initially fractionated to obtain hydrocarbons having relatively narrow carbon number ranges, for example a fraction made up of four to six carbon atoms which typically contains about 5 to 70, especially about 8 to 50 wt. percent of diolefins such as butadiene, pentadiene, methylbutadiene, hexadiene, etc., and about 200 to 5000 p.p.m. or more of $C_2$ to $C_6$ acetylenes such as ethyl acetylene, vinyl acetylene, etc., with the remainder of the stream being essentially monoolefins such as butenes, pentenes, etc. Well-known extractive processes may be used to separate the diolefins from the monoolefins, but the instant process must be used before, during or after such extractive process since the acetylenes are usually concentrated along with the diolefins during the extraction, e.g. see U.S. 2,566,135.

The treating solution employed in this process comprises a cuprous salt, a base and water. The cuprous salt is generally present in amounts ranging from about 3 to 35 wt. percent, preferably 10 to 25 wt. percent, based on the weight of the treating solution. Suitable cuprous salts include cuprous halides such as cuprous chloride and cuprous bromide; cuprous salts of $C_1$ to $C_4$ monocarboxylic acids such as cuprous acetate; cuprous ammonium salts of $C_1$ to $C_4$ monocarboxylic acids such as cuprous ammonium acetate; and less preferably cuprous hydroxide or cuprous cyanide; mixtures of these cuprous salts are also suitable although less preferred.

The base must be one which, in combination with water, (a) has appreciable solubility for the cuprous salt, (b) does not form an insoluble complex with the cuprous salt, (c) does not convert the cuprous salt to metallic copper or cupric salts and (d) most importantly, has low solubility for the cuprous acetylides at the treating temperatures and treating ratios for the cuprous acetylides to create the strong driving force for the reaction, i.e. at the proper treating temperatures and ratios, the cuprous acetylides will be soluble in the treating solution to an extent of less than about 0.2 wt. percent, preferably less than 0.1 wt. percent.

Suitable bases for the purposes of this invention include ammonia; ammonium hydroxide; $C_1$ to $C_{18}$ amines (which may be aliphatic, cycloaliphatic or aromatic in nature) such as methyl amine, propyl amine, isoamylamine, cyclohexyl amine, aniline, naphthyl amine, etc.; ammonium salts of weak acids such as ammonium carbonate, ammonium bicarbonate, dibasic ammonium phosphate, etc.; ammonium salts of strong acids (e.g. $NH_4Cl$, NH₄Br, etc.) in admixture with ammonia, ammonium hydroxide or one of the above amines; and mixtures thereof. The base is generally employed in an amount of about 10 to about 35 wt. percent, preferably 15 to 30 wt. percent, based on the weight of the treating solution. In any event, sufficient amounts of the base of choice should be used so as to render the treating solution basic, i.e. the treating solution should have a pH of about 7.5 or higher, preferably in the range of 9 to 13.5. The bases found to be most preferable for the purposes of the present invention are ammonia, ammonium hydroxide and $C_1$ to $C_4$ alkyl amines such as methyl amine.

Water is utilized in the treating solution in an amount of about 55 to about 87 wt. percent, preferably 60 to 75 wt. percent, based on the weight of the treating solution. The use of water in amounts of less than about 55 wt. percent is undesirable for several reasons. Firstly, small amounts of water may lead to the formation of precipitated complex cuprous acetylides rather than precipitated simple cuprous acetylides during the treating step and it has been found that the treating solution has a much higher capacity for the selective removal of acetylenes when conditions favoring the formation of precipitated simple cuprous acetylides are employed. Secondly, the use of small amounts of water causes increased dissolution of the simple cuprous acetylides rather than their precipitation in the treating solution and thus the driving force favoring a high conversion rate is lessened. Thirdly, highly concentrated treating solutions favor the absorption of significant amounts of diolefins from the acetylenes-containing stream thereby causing contamination problems upon the liberation and recovery of the acetylenes from the simple cuprous acetylides. Finally concentrated treating solutions favor the polymerization of acetylenes upon heating the simple cuprous acetylide-containing treating solution to liberate the acetylenes, thereby preventing quantitative recovery of the acetylenes in a pure state.

Although the simple cuprous acetylides are mildly explosive, this disadvantage is readily avoided by the simple expedient of never heating them in a dry state to liberate the acetylenes, i.e. the liberation reaction should always take place in the presence of a proton donor as will be described below.

The acetylenes-containing stream is contacted in the gaseous or liquid phase with about 10 to about 100, preferably 20 to 70 parts by weight, per part by weight of acetylenes in the stream, of the treating solution. This treatment step should take place at temperatures in the range of about $-10$ to $+40°$ C., preferably 0 to 30° C. Contact times for gas-liquid treatment are generally in the order of 1 to 300 seconds, preferably 5 to 100 seconds, while liquid-liquid contact times are in the order of 1 to 120 minutes, preferably 5 to 40 minutes. Pressures during treatment are not critical and may range from 10 to 60 p.s.i.a. for gas-liquid treatments and from 15 to 200 p.s.i.a. for liquid-liquid treatments.

When the treatment is carried out in accordance with the treating solution and conditions set forth above, over 99.8 wt. percent of the cuprous acetylides which are formed during the treating step will be present in a precipitated form and substantially all of the acetylenes in the acetylenes-containing stream will be selectively removed therefrom, i.e. the acetylene content of the stream will be usually reduced to a level of less than 10 p.p.m.

After the treatment step the acetylenes are liberated from the resultant precipitated cuprous acetylide-treating solution slurry by heating the slurry at 60 to 110° C. in the presence of a proton donor and recovering the gaseous acetylenes liberated therefrom. Diolefin desorption systems such as are described in U.S. Patents 2,847,487 and 2,985,697 have not been found to be necessary since the highly aqueous nature of the treating solution precludes the physical absorption of significant amounts of diolefins in the treating solution. However, where quantitative recovery of the diolefins is desired, the reaction mixture slurry can be stripped with a suitable inert stripping gas, prior to heating the slurry; examples of suitable stripping gases include, nitrogen, argon, helium, natural gas, etc. No significant amount of acetylenes re-contamination of the diolefins will occur during such stripping operations since substantially all of the acetylenes are present in the form of insoluble cuprous acetylides (particularly if the stripping operations are carried out at low temperatures, e.g. $-10°$ C. to 30° C.).

Optionally, a stripping gas of the type described above may be employed during liberation of the acetylenes from the reaction mixture slurry; this technique is particularly useful where quantitative recovery of the acetylenes is desired.

In order to prevent violent decomposition of the precipitated cuprous acetylides, they must at all times be heated in the presence of about 0.5 to about 2, preferably 0.8 to 1.25, equivalents of a proton donor per equivalent of cuprous ion in the cuprous acetylide solids. Suitable proton donors include hydrohalogen acids such as HCl, HBr, etc., $C_1$ to $C_{18}$ aliphatic, cycloaliphatic and aromatic acids such as acetic acid, diethyl acetic acid, cyclohexane dicarboxylic acid, naphthoic acid, etc.; amine or ammonium salts of hydrohalogen acids such as $CH_3NH_2 \cdot HCl$, $NH_4Cl$, etc.; amine or ammonium salts of $C_1$ to $C_{18}$ organic acids such as $CH_3COONH_4(C_2H_5)_2CHCOONH_4$ and mixtures thereof, etc; preferably the anionic moiety of the proton donor should be the same as that of the cuprous salt employed in the treating solution. In this latter case, all that need be done to liberate the acetylenes is to heat the slurry of cuprous acetylides in the treating solution after the treating step has been carried out. This technique is exemplified by the following reaction:

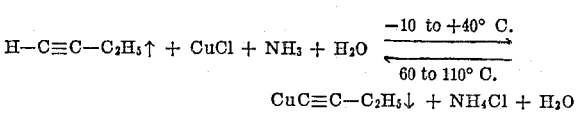

$$H-C{\equiv}C-C_2H_5\uparrow + CuCl + NH_3 + H_2O \xrightarrow[60 \text{ to } 110°\text{ C.}]{-10 \text{ to }+40°\text{ C.}}$$
$$CuC{\equiv}C-C_2H_5\downarrow + NH_4Cl + H_2O$$

If desired, the slurry of cuprous acetylides in the treating solution may first be concentrated, e.g. by filtration prior to liberation of the acetylenes. The moist acetylides may then be heated in the presence of the same proton donor as is formed during the treatment step or a different proton donor or mixtures thereof. In this particular embodiment the required quantity of proton donor would of course be dissolved in an amount of water sufficient to permit re-use of the solution remaining behind after liberation of the acetylenes, in the treating solution.

Regardless of the particular embodiment employed in the liberation of the acetylenes from the precipitated cuprous acetylides, it is advantageous to recycle the solution which results after liberation of the acetylenes to the treating step. If necessary, additional amounts of water, base and cuprous salt should be added to the recycled solution so that its composition will conform to the requirements for the treating solution as set forth above. In this manner, the cuprous salt (which is the most expensive ingredient in the treating solution) can be recovered in a substantially quantitative manner for re-use in the treating solution, i.e. to contact fresh quantities of acetylene-containing streams.

The following examples are submitted to illustrate this invention. Unless otherwise indicated, all parts and percentages are by weight.

EXAMPLES 1–5

Several aqueous basic-cuprous salt containing solutions were prepared and placed in gas bubblers. Acetylene-containing streams of the average composition set forth below were then fed, in the gaseous phase, at room temperature and atmospheric pressure, at the rate of 0.2 liters/min. through the bubblers.

Average composition of acetylene-containing streams

| Constituent: | Mole, percent |
|---|---|
| Butadiene | 30–35 |
| Isobutylene and butene-1 | 52–57 |
| Butenes | 13 |
| $C_3$–$C_4$ acetylenes | 0.3 |

A gas chromatograph was used to determine the composition of the gases emerging from the bubblers. The contacting step was continued until "breakthrough," i.e. until the acetylene content of the effluent gases exceeded 200 p.p.m. The capacity of the treating solution in liters of gas treated per gram of cuprous salt in the treating solution was determined at the breakthrough point. The results are shown in Table I.

TABLE I

| Example | Cuprous Salt | Wt. of Cuprou Salt, g.s | Solvent | Solvent, g. | Base | Base, g. | Capacity at Breakthrough, Liters of Gas/ Grams of Cu Salt | Remarks |
|---|---|---|---|---|---|---|---|---|
| 1 | CuCl | 7.9 | $H_2O$ | 104 | $NH_3$ | 40 | 25 | Bright yellow, ppt. formed. |
| 2 | CuCl | 4.0 | $H_2O$ | 104 | $NH_3$ | 40 | 45 | Do. |
| 3 | CuAc [1] | 19.6 | $H_2O$ | 38.3 | $NH_3$ | 10.6 | 6.4 | Do. |
| 4 | CuCl | 15.7 | None | | DETA [2] | 160 | 2 | Complex formed. |
| 5 | CuCl | 10 | $H_2O$ | 60 | MA [3] | 35 | 28 | Bight yelow, ppt. formed. |

[1] Cuprous acetate.  [2] Diethylenetriamine.  [3] Methylamine.

As many apparently widely different embodiments of this invention may be made without departing from the spirit and scope of it, it is to be understood that the present invention is not limited to the specific embodiments herein except as defined in the appended claims.

What is claimed is:
1. A process for selectively removing acetylenes from a $C_2$ to $C_{12}$ acetylenes-containing stream containing other highly reactive materials which comprises the steps of:
 (a) contacting said stream at a temperature of about −10° C. to about +40° C. with about 10 to about 100 parts by weight per part by weight of said acetylenes, of a treating solution containing:
   (1) about 3 to about 35 wt. percent, based on the weight of the treating solution, of a cuprous salt selected from the group consisting of cuprous halides, cuprous salts of $C_1$ to $C_8$ monocarboxylic acids, cuprous ammonium salts of $C_1$ to $C_8$ monocarboxylic acids, cuprous hydroxide, cuprous ammonium salts of $C_1$ to $C_8$ monocarboxylic acids, cuprous hydroxide, cuprous cyanide and mixtures thereof;
   (2) water in an amount of about 55 to about 87 wt. percent, based on the weight of the treating solution; and
   (3) about 10 to about 35 wt. percent, based on the weight of the treating solution, of a base selected from the group consisting of $C_1$ to $C_{18}$ amines, ammonia, ammonium hydroxide, ammonium salts of weak acids, ammonium salts of strong acids in admixture with an amine, ammonia or ammonium hydroxides, and mixtures of the aforesaid bases;
 (b) separating the treated stream substantially reduced in acetylenes content from the resultant treating solution containing precipitated cuprous acetylides; and
 (c) liberating the acetylenes by heating the precipitated cuprous acetylides at a temperature of about 60° C. to about 110° C. in the presence of about 0.5 to about 2 equivalents, per equivalent of cuprous ion in the precipitated cuprous acetylides, of a proton donor selected from the group consisting of hydrohalogen acids, $C_1$ to $C_{18}$ organic acids, amine or ammonium salts of hydrohalogen acids, amine or ammonium salts of $C_1$ to $C_{18}$ organic acids and mixtures thereof, and recovering the acetylenes thus liberated.

2. The process of claim 1 in which the treating solution contains 60 to 75 wt. percent water, based on the weight of said treating solution.

3. The process of claim 1 in which the resultant treating solution containing precipitated cuprous acetylides is:
 (a) heated at a temperature of about 60° C. to about 110° C. in the presence of about 0.5 to about 2 equivalents, per equivalent of cuprous ion in the precipitated cuprous acetylides, of a proton donor selected from the group consisting of hydrohalogen acids, $C_1$ to $C_{18}$ organic acids, amine or ammonium salts of hydrohalogen acids, amine or ammonium salts of $C_1$ to $C_{18}$ organic acids and mixtures thereof, and the acetylenes liberated during such heating are recovered; and
 (b) the treating solution remaining after recovery of the acetylenes is re-used to contact additional quantities of the $C_2$ to $C_{12}$ acetylenes-containing stream.

4. The process of claim 3 in which the resultant treating solution containing precipitated cuprous acetylides, prior to heating, is stripped with an inert stripping gas to remove any unreacted physically absorbed materials.

5. The process of claim 1 in which the resultant treating solution containing precipitated cuprous acetylides is initially filtered to separate the treating solution therefrom and the separated treating solution is re-used to contact additional quantities of the $C_2$ to $C_{12}$ acetylenes-containing stream.

6. The process of claim 1 in which the acetylenes-containing stream is present in a gaseous form during contact with the treating solution.

7. The process of claim 1 in which the heating of the cuprous acetylides takes place in the additional presence of an inert stripping gas and the liberated acetylenes are recovered from the overhead stripping gases.

8. The process of claim 1 in which the cuprous salt is cuprous chloride and the base is ammonium hydroxide.

9. The process of claim 1 in which the cuprous salt is cuprous acetate and the base is ammonium hydroxide.

10. The process of claim 1 in which the acetylene-containing stream is a crude $C_4$–$C_6$ stream containing about 8 to about 50 wt. percent diolefins.

References Cited

UNITED STATES PATENTS

| 2,370,809 | 3/1945 | Morrell et al. | 260—677 |
| 2,566,136 | 8/1951 | Morrell | 260—681.5 |
| 2,972,646 | 2/1961 | Cahn et al. | 260—681.5 |
| 2,985,697 | 5/1961 | Cahn | 260—681.5 |

DELBERT E. GANTZ, *Primary Examiner.*

G. E. SCHMITKONS, *Assistant Examiner.*